(12) United States Patent
Chang et al.

(10) Patent No.: US 9,158,404 B2
(45) Date of Patent: Oct. 13, 2015

(54) TOUCH DISPLAY DEVICE AND METHOD

(71) Applicant: HIMAX TECHNOLOGIES LIMITED, Tainan (TW)

(72) Inventors: Yaw-Guang Chang, Tainan (TW); Wei-Song Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 103 days.

(21) Appl. No.: 14/020,150

(22) Filed: Sep. 6, 2013

(65) Prior Publication Data

US 2014/0333546 A1 Nov. 13, 2014

Related U.S. Application Data

(60) Provisional application No. 61/822,908, filed on May 13, 2013.

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 3/0416* (2013.01)

(58) Field of Classification Search
None
See application file for complete search history.

(56) References Cited

U.S. PATENT DOCUMENTS

2012/0274603 A1  11/2012  Kim et al.
2014/0204049 A1*  7/2014  Tsai et al. ............... 345/174

FOREIGN PATENT DOCUMENTS

CN    102109695    6/2011
TW    200945155    11/2009

OTHER PUBLICATIONS

"Office Action of Taiwan Counterpart Application", issued on Feb. 17, 2015, p. 1-p. 7.

* cited by examiner

*Primary Examiner* — Kenneth B Lee, Jr.
(74) *Attorney, Agent, or Firm* — J.C. Patents

(57) ABSTRACT

A touch display device including an active matrix, a driving module, a sensing module and a control unit is provided. The active matrix includes a plurality of common electrodes, scan lines, and data lines. At least parts of the common electrodes form a first touch electrode set and at least parts of the data lines form a second touch electrode set. The control unit is configured to cause the driving module to drive the scan lines, the data lines, and the common electrodes in at least one display driving period to perform a displaying function, and to cause the driving module to drive one of the first touch electrode set and the second touch electrode set and cause the sensing module to receive signals from the other in at least one touch sensing period so as to perform a touch sensing function. A touch display method is also provided.

16 Claims, 7 Drawing Sheets

TOUCH DISPLAY DEVICE AND METHOD

CROSS-REFERENCE TO RELATED APPLICATION

This application claims the priority benefits of U.S. provisional application Ser. No. 61/822,908, filed on May 13, 2013. The entirety of the above-mentioned patent applications is hereby incorporated by reference herein and made a part of this specification.

BACKGROUND OF THE INVENTION

1. Field of the Invention

The invention generally relates to a display device and a display method and, more particularly, to a touch display device and a touch display method.

2. Description of Related Art

A display apparatus having a touch-sensing function is generally implemented by a touch system and a display system independent to each other. System integration and cost reduction are unchanged developing trends of electronics industry. With progress of fabrication techniques, a touch panel is now successfully integrated with a display panel, so that a user can direct an electronic device to perform required operations through touch operations.

Generally, common electrodes of the display panel can be used as a transmitter of the touch panel, and an indium tin oxide (ITO) pattern on the color filters of the display panel can be used as a receiver of the touch panel. However, in this way, a process for defining the ITO pattern and an external control circuit for driving the common electrodes and the ITO pattern is required.

SUMMARY OF THE INVENTION

Accordingly, the invention is directed to a touch display device and a touch display method which are capable of reducing cost of production.

An embodiment of the invention provides a touch display device including an active matrix, a driving module, a sensing module, and a control unit. The active matrix includes a plurality of common electrodes, a plurality of scan lines, a plurality of data lines, and a plurality of active devices, wherein at least parts of the common electrodes form a first touch electrode set and at least parts of the data lines form a second touch electrode set. Each of the active devices is coupled to one of the scan lines and one of the data lines. The driving module is coupled to the common electrodes, the scan lines, and the data lines. The sensing module is coupled to at least one of the first touch electrode set and the second touch electrode set. The control unit is coupled to the driving module and the sensing module and is configured to define frame times, wherein each of the frame times includes at least one display driving period and at least one touch sensing period. Moreover, the control unit is configured to cause the driving module to drive the scan lines, the data lines, and the common electrodes in the at least one display driving period to perform a displaying function. Besides, the control unit is configured to cause the driving module to drive one of the first touch electrode set and the second touch electrode set and cause the sensing module to receive signals from the other one of the first touch electrode set and the second touch electrode set in the at least one touch sensing period so as to perform a touch sensing function.

An embodiment of the invention provides a touch display method includes following steps. Frame times are defined, wherein each of the frame times includes at least one display driving period and at least one touch sensing period. A plurality of scan lines, a plurality of data lines, and a plurality of common electrodes are driven in the at least one display driving period to perform a displaying function, wherein the scan lines and the data lines are coupled through a plurality of active devices and each of the active devices is coupled to one of the scan lines and one of the data lines. One of a first touch electrode set and a second touch electrode set is driven and signals from the other one of the first touch electrode set and the second touch electrode set are received in the at least one touch sensing period so as to perform a touch sensing function, wherein the first touch electrode set is formed with at least parts of the common electrodes and the second touch electrode set is formed with at least parts of the data lines.

As described above, in a touch display device and a touch display method provided by the invention, a first touch electrode set and a second touch electrode set are formed by at least parts of common electrodes and at least parts of the data lines respectively. Moreover, the touch display device is capable of taking one of the first touch electrode set and the second touch electrode set as a transmitter and taking the other one of the first touch electrode set and the second touch electrode set as a receiver. In this way, the touch display device is capable of driving the first touch electrode set and the second touch electrode set through the same driving module which is used for driving the common electrodes and the data lines so as that it is not necessary to dispose an external control circuit. Besides, it is also not necessary to adding any process for defining any external pattern of electrodes which is used as the transmitter or the receiver of the touch display device. Therefore, the touch display device and the touch display method are capable of reducing cost of products.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
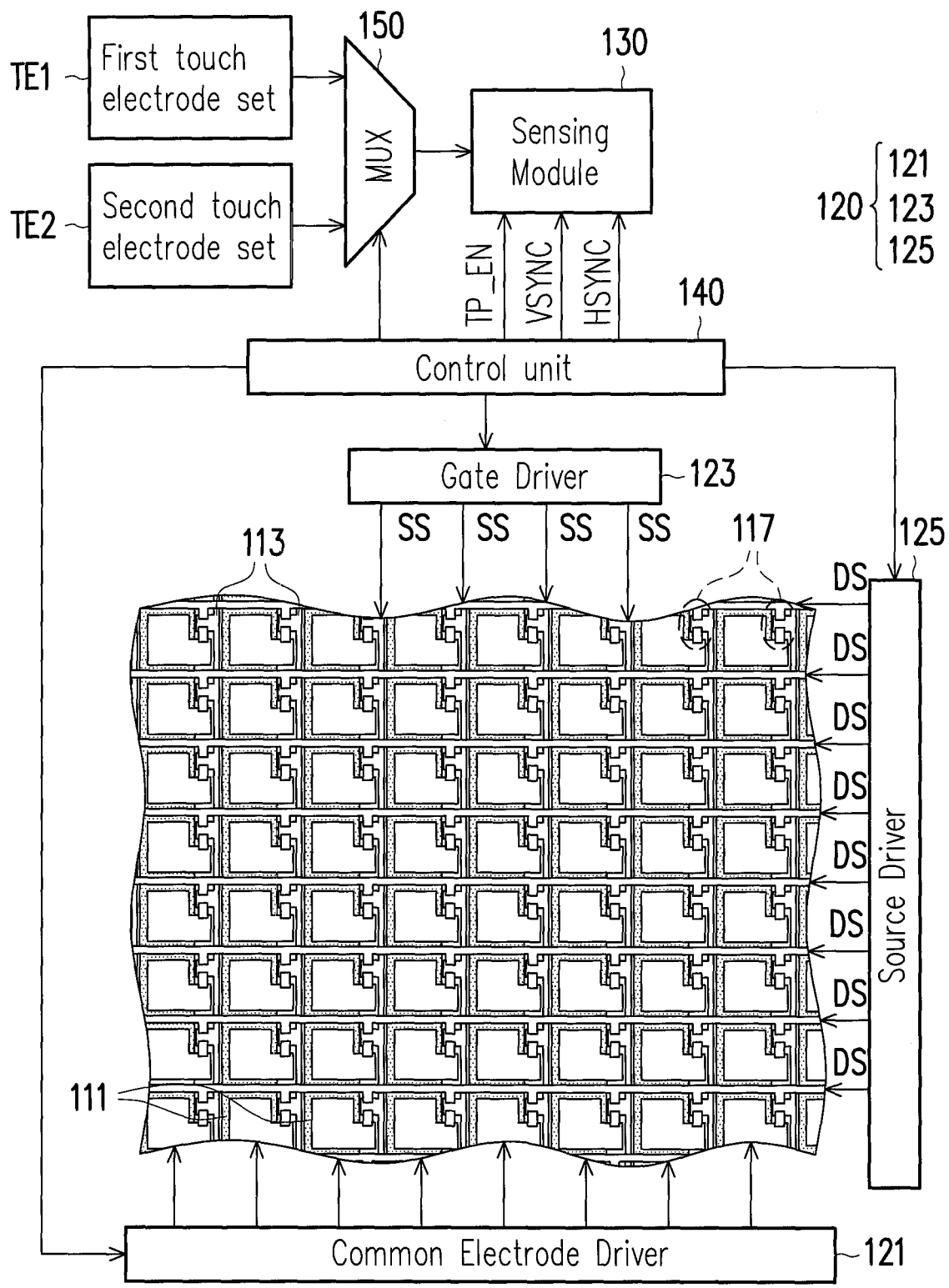
FIG. 1 is a block diagram of a touch display device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
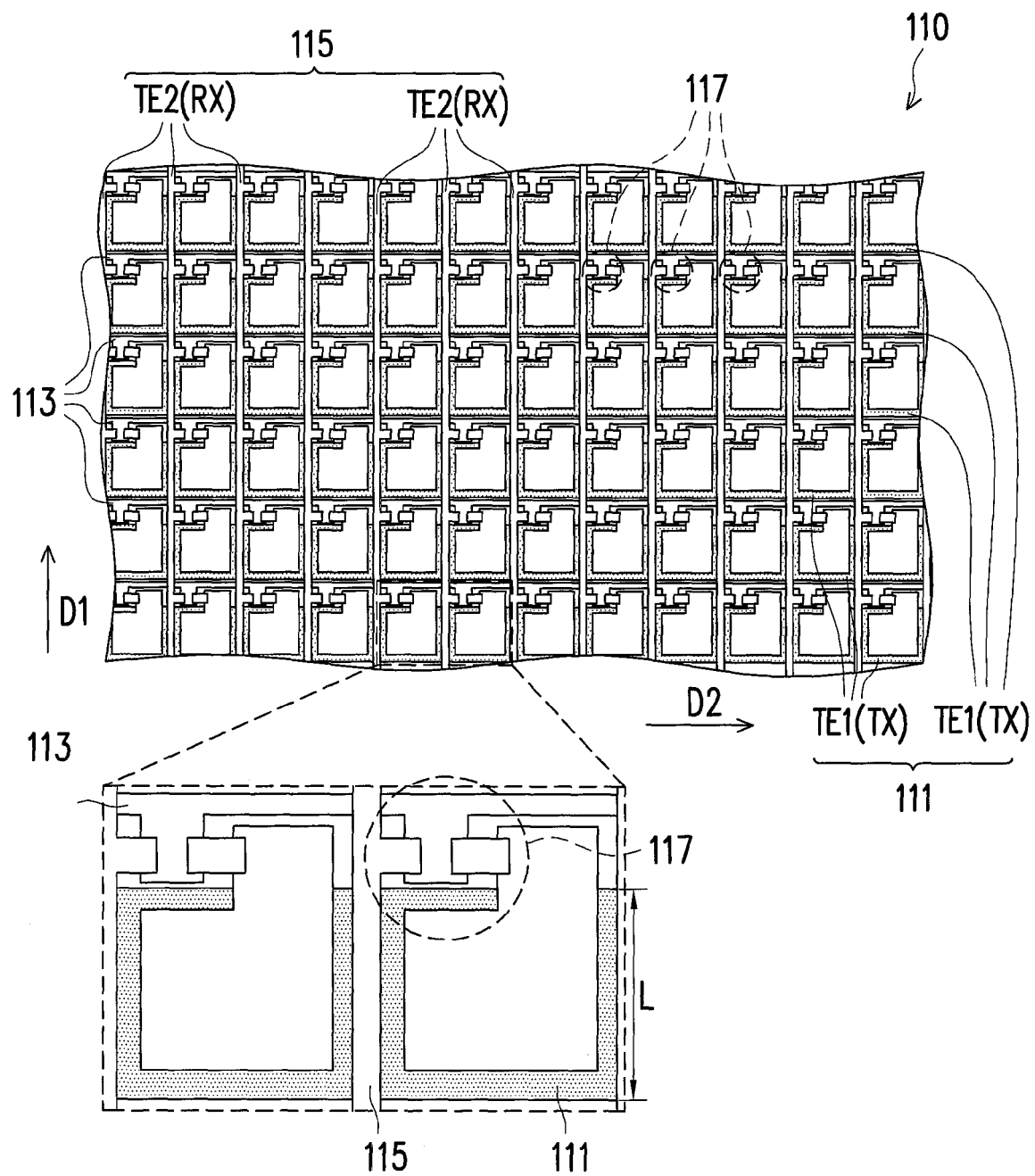
FIG. 2 is a schematic diagram illustrating an active matrix in the embodiment illustrated in FIG. 1.

FIG. 1 is a block diagram of a touch display device according to an embodiment of the invention. FIG. 2 is a schematic diagram illustrating an active matrix in the embodiment illustrated in FIG. 1. Referring to FIG. 1 and FIG. 2, the touch display device 100 includes an active matrix 110, a driving module 120, a sensing module 130, and a control unit 140. In the present embodiment, the touch display device 100 is a liquid crystal display (LCD) or any other handheld electronic device which can be provided displaying function and touch sensing function. However, the type of the touch display device 100 is not limited in the invention. The driving module 120, the sensing module 130, and the control unit 140 may be functional modules implemented as hardware, wherein the hardware may be any one or a combination of different hardware devices.

Referring to FIG. 2, in the present embodiment, the active matrix 110 includes a plurality of common electrodes 111, a plurality of scan lines 113, a plurality of data lines 115, and a plurality of active devices 117 disposed on a substrate, e.g. a transparent substrate, wherein the transparent substrate is, for example, a glass substrate or a plastic substrate. The active matrix 110 may be a thin film transistor substrate, an opposite substrate, e.g. a color filter substrate, may be disposed over the active matrix 110, and a liquid crystal layer is disposed between the active matrix 110 and the opposite substrate. Each of the active devices 117 are coupled to one of the scan lines 113 and one of the data lines 115. To be specific, at least parts of the common electrodes 111 form a first touch electrode set TE1 and at least parts of the data lines 115 form a second touch electrode set TE2.

Referring to FIG. 1 and FIG. 2 again, in the present embodiment, the driving module 120 is coupled to the common electrodes 111, the scan lines 113, and the data lines 115, and the sensing module 130 is coupled to at least one of the first touch electrode set TE1 and the second touch electrode set TE2. Besides, the control unit 140 is coupled to the driving module 120 and the sensing module 130. Below, the functions of different modules and the elements of the touch display device 100 to perform the displaying function and the touch sensing function in the present embodiment will be explained in detail with reference to FIG. 3-FIG. 6.

Figure 3:
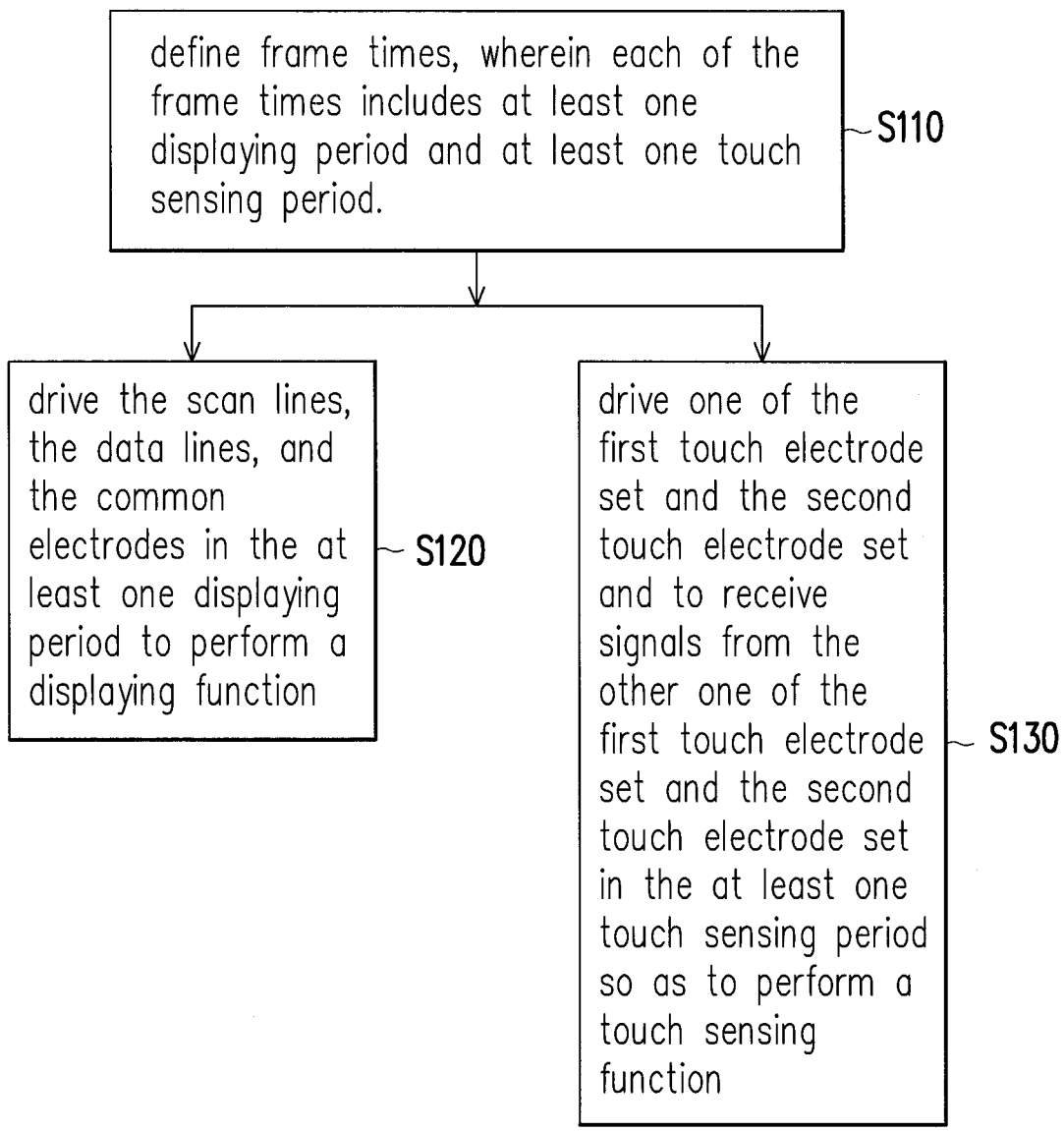
FIG. 3 is a flowchart of a touch display method according to an embodiment of the invention.

FIG. 3 is a flowchart of a touch display method according to an embodiment of the invention. Referring to FIG. 3, the touch display method in the present embodiment can be executed by the touch display device 100 illustrated in FIG. 1, but the invention is not limited thereto. As shown in FIG. 3, the touch display method includes following steps. First, in step S110, frame times are defined, wherein each of the frame times includes at least one display driving period and at least one touch sensing period. For example, the step S110 can be executed by the control unit 140, but the invention is not limited thereto.

Then, in step S120, a plurality of scan lines 113, a plurality of data lines 115, and a plurality of common electrodes 111 are driven in the at least one display driving period to perform a displaying function, and in step S130, one of a first touch electrode set TE1 and a second touch electrode set TE2 is driven and signals from the other one of the first touch electrode set TE1 and the second touch electrode set TE2 are received in the at least one touch sensing period so as to perform a touch sensing function. To be specific, step S120 can be executed by the driving module 120 through the control unit, and step S130 can be executed by the driving module 120 and the sensing module 130 through the control unit 140; however, the invention is not limited thereto.

Below, the different touch display modes of the touch display device 100 to perform the displaying function and the touch sensing function in the present embodiment will be explained in detail with reference to FIG. 4-FIG. 6.

Figure 4:
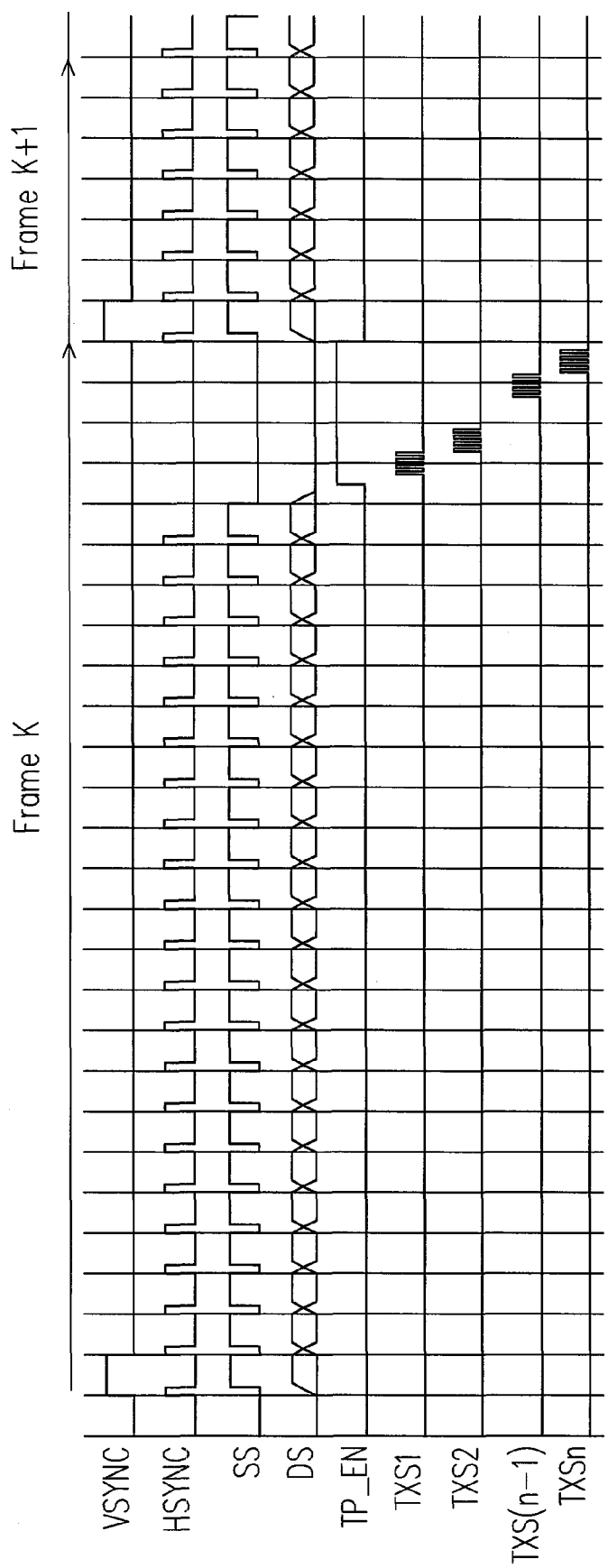
FIG. 4 is a schematic diagram showing a touch display mode of a touch display device in the embodiment illustrated in FIG. 3.

FIG. 4 is a schematic diagram showing a touch display mode of a touch display device in the embodiment illustrated in FIG. 3. Referring to FIG. 4, in the present embodiment, a plurality of vertical synchronization signals VSYNC, a plurality of horizontal synchronization signals HSYNC, a plurality of touch enabling signals TP_EN can be applied for driving the active matrix 110 through the control unit 140 so as to define the frame times. To be specific, the period from the beginning of a pulse of the vertical synchronization signal VSYNC to the beginning of the next pulse of the vertical synchronization signal VSYNC is the period of an image frame (namely a frame time) of the touch display device 100.

Moreover, there is one touch enabling signal TP_EN in a frame time. The period when the touch enabling signals has a high voltage level is the touch sensing period of the touch display device 100. To be specific, each of the touch enabling signals TP_EN ensures the scan of the sensing module 130 starts at the right time and the active devices 117 are in an off state during the at least one touch sensing period.

To be more specific, the single display driving period are defined within the low voltage levels of the touch enabling signals TP_EN, respectively while the touch sensing period are defined within the high voltage level of the touch enabling signals TP_EN. In addition, as shown in FIG. 4, in the present embodiment, each touch enabling signal TP_EN is applied after the pulse of the last horizontal synchronization signal HSYNC in the frame time. That is, in the present embodiment, each of the frame times includes a single display driving period and a single sensing period following or followed by the single display driving period, wherein the display driving period is from the beginning of the first pulse of the horizontal synchronization signal HSYNC to the end of the last pulse of the horizontal synchronization signal HSYNC in a frame time.

Referring to FIG. 1 and FIG. 4, during the display driving period, the control unit 140 is configured to cause the driving module 120 to drive the scan lines 113, the data lines 115, and the common electrodes 111 in the display driving period to perform a displaying function. To be specific, as shown in FIG. 1, in the present embodiment, the driving module 120 includes a common electrode driver 121, a gate driver 123, and a source driver 125. To be more specific, a plurality of scan signals SS and a plurality of source signals DS can be applied for driving the scan lines 113 and the data lines 115 through the gate driver 123 and the source driver 125 of the control unit 140 respectively. To be more specific, the pulse of each of the scan signals SS is coming right after the pulse of each of the horizontal synchronization signals HSYNC and the control unit 140 is configured to cause the driving module 120 to drive the scan lines 113 by applying the scan signals SS in turn in the display driving period.

On the other hand, referring to FIG. 1 again, during the touch sensing period, the control unit 140 is configured to cause the driving module 120 to drive one of the first touch electrode set TE1 and the second touch electrode set TE2 through the common electrode driver 121 or a source driver 125. On the other hand, the control unit 140 is also configured to cause the sensing module 130 to receive signals from the other one of the first touch electrode set TE1 and the second touch electrode set TE2 in the touch sensing period so as to perform a touch sensing function.

To be more specific, in the present embodiment, the one of the first touch electrode set TE1 and the second touch electrode set TE2 includes a plurality of first electrode subsets TX arranged along a first direction D1, the other one of the first touch electrode set TE1 and the second touch electrode set TE2 includes a plurality of the second electrode subsets RX arranged along a second direction D2. For example, in the present embodiment, the first touch electrode set TE1 includes the first electrode subsets TX and the second touch electrode set TE2 includes the second electrode subsets RX; however, the invention is not limited thereto. To be specific, the touch display device 100 further includes a multiplexer 150 coupled to the first touch electrode set TE1, the second touch electrode set TE2, the control unit 140, and the sensing module 130. Moreover, the control unit 140 control the multiplexer 150 to determine that the signals from which one of the first touch electrode set TE1 and the second touch electrode set TE2 are received by the sensing module 130, that is to say, the control unit 140 control the multiplexer 150 to which one of the first touch electrode set TE1 and the second touch electrode set TE2 includes a plurality of second electrode subsets RX.

Moreover, during the period of applying a touch enabling signal TP_EN (namely the touch sensing period), at least one transmitting signals TXS can be applied for driving the active matrix 110 through the control unit 140 so as to drive the first electrode subsets TX as a transmitter. For example, in the present embodiment, a plurality of transmitting signals TXS can be applied in turn in the touch sensing period. On the other hand, a plurality of receiving signals RXS from the second electrode subsets, as a receiver, can be received by the sensing module 130. Therefore, in the present embodiment, the touch display device 100 is capable of completing a touch sensing procedure in the touch sensing time of a frame time; however, the invention is not limited thereto. In other embodiments, the touch display device 100 is also capable of completing more than one touch sensing procedure in a frame time, which will be further described in detail with reference to FIG. 5-FIG. 6.

Figure 5:
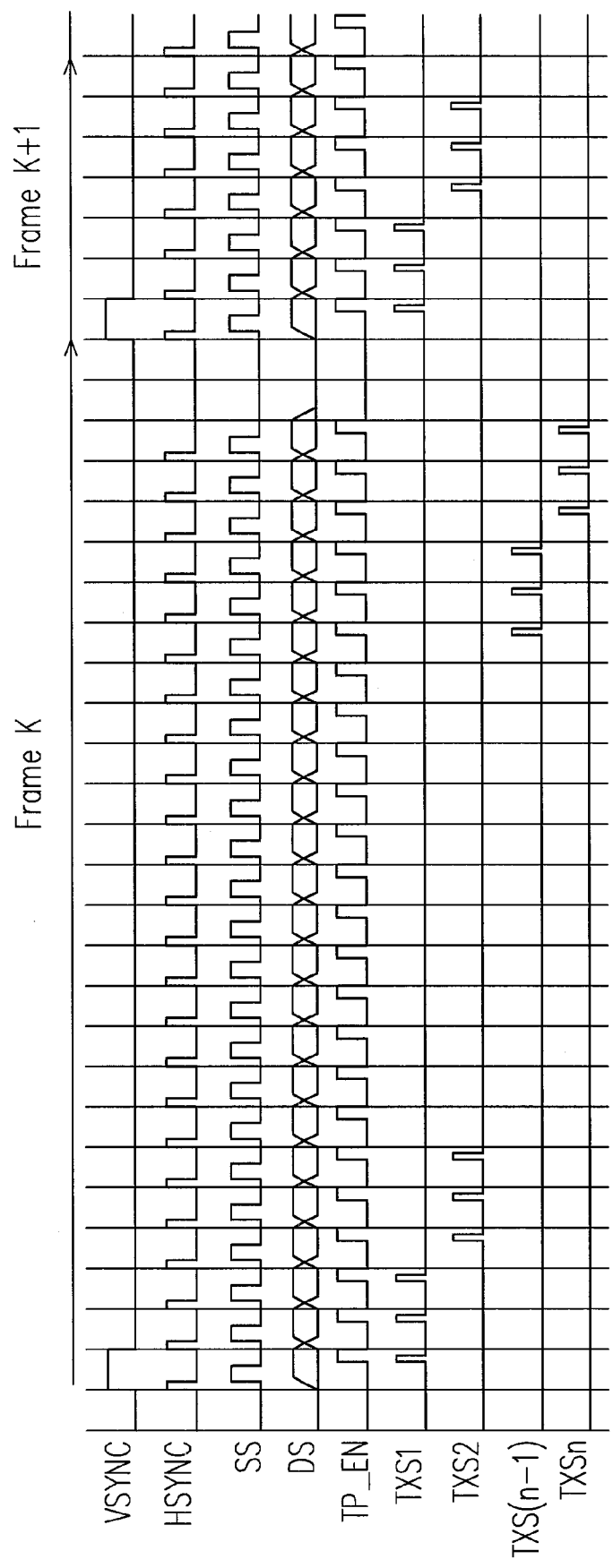
FIG. 5 is a schematic diagram showing another touch display mode of a touch display device in the embodiment illustrated in FIG. 3.

FIG. 5 is a schematic diagram showing another touch display mode of a touch display device 100 in the embodiment illustrated in FIG. 3. Referring to FIG. 5, the touch display mode in the present embodiment may be executed by the touch display device 100 illustrated in FIG. 1 and the touch display method illustrated in FIG. 3. The touch display mode in the present embodiment is similar to the touch display mode in the embodiment illustrated in FIG. 4, and only the differences between the two touch display modes will be explained below.

Referring to FIG. 5, in the present embodiment, there is a plurality of touch enabling signals TP_EN in a frame time. Moreover, the pulse of each of the touch enabling signals TP_EN is applied right after the pulse of each of the scan signals SS. That is, in the present embodiment, each of the frame times includes a plurality of display driving period and a plurality of sensing period, and the display driving period and the touch sensing periods occur alternately in each of the frame times, wherein the display driving period is from the beginning of the pulse of a horizontal synchronization signal HSYNC to the beginning of the pulse of the touch enabling signal TP_EN which is following the horizontal synchronization signal HSYNC.

To be more specific, during the display driving periods, the control unit 140 is configured to cause the driving module 120 to drive one of the scan lines 113 in each of the display driving periods, that is, each of the scan signals SS is applied through the control unit 140 in each of the display driving period to drive each of the scan lines 113, respectively. On the other hand, during the touch sensing periods, the control unit 140 causes the driving module 120 to drive one of the first electrode subsets TX during each of the touch sensing periods, that is, each of the transmitting signals TXS (ie: TXS1, TXS2, . . . TXS (n–1), or TXSn) can be applied in each of the touch sensing period through the control unit 140 to drive each of the first electrode subsets TX as a transmitter, respectively. In this way, the report rate of the touch display device 100 for touch sensing would not be limited by the frame rate of the touch display device 100; however, the time of completing a touch sensing procedure would disperse to the different touch sensing periods.

Figure 6:
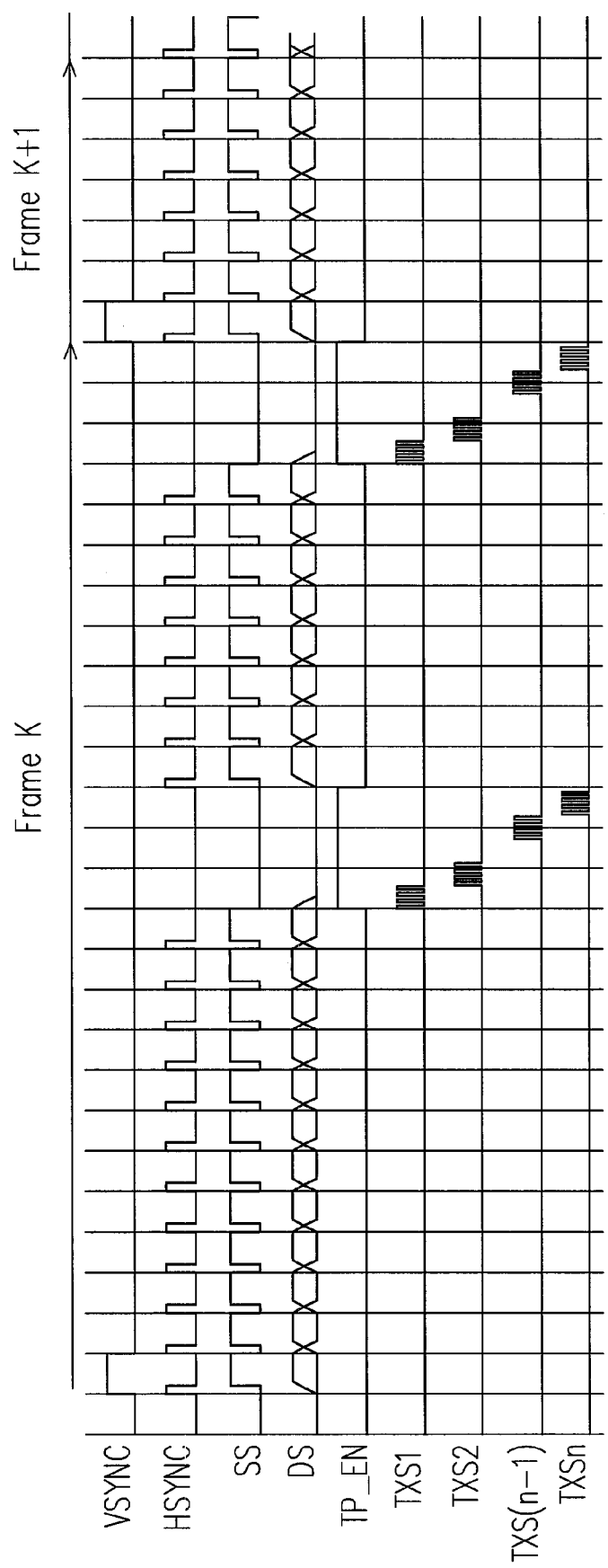
FIG. 6 is a schematic diagram showing another touch display mode of a touch display device in the embodiment illustrated in FIG. 3.

FIG. 6 is a schematic diagram showing another touch display mode of a touch display device in the embodiment illustrated in FIG. 3. Referring to FIG. 6, the touch display mode in the present embodiment may be executed by the touch display device 100 illustrated in FIG. 1 and the touch display method illustrated in FIG. 3. The touch display mode in the present embodiment is similar to the touch display mode in the embodiment illustrated in FIG. 5, and only the differences between the two touch display modes will be explained below.

Referring to FIG. 6, in the present embodiment, at least part of the touch enabling signals TP_EN is applied between the pulse of two adjacent scan signals SS in a frame time. That is, in the present embodiment, each of the frame times includes a plurality of display driving period and a plurality of touch sensing period, and the display driving period and the touch sensing periods occur alternately in each of the frame times, wherein the display driving period is from the end of a touch enabling signal TP_EN to the beginning of the pulse of the next touch enabling signal TP_EN.

To be more specific, during the display driving periods, the control unit 140 is configured to cause the driving module 120 to drive parts of the scan lines 113 in turn in each of the display driving periods, that is, parts of the scan signals SS are applied through the control unit 140 in each of the display driving period to drive each of the scan lines 113, respectively. On the other hand, during the touch sensing periods, the control unit 140 causes the driving module 120 to drive at least parts of the first electrode subsets TX in turn during each of the touch sensing periods, that is, at least parts of the transmitting signals TXS can be applied in turn in each of the touch sensing period through the control unit 140 to drive each of the first electrode subsets TX as a transmitter, respectively. In this embodiment, all of the first electrode subsets TX are driven in turn during each of the touch sensing periods. In this way, the report rate of the touch display device 100 for touch sensing would not be limited by the frame rate of the touch display device 100. Moreover, it is optional that the period of completing a touch sensing procedure (i.e. driving all of the first electrode subsets TX) would disperse to the different touch sensing periods. Besides, those skilled in the art can determine the quantity of touch sensing periods so as to achieve the demand of report rate of the touch display device 100.

Besides, as shown in FIG. 2, in the present embodiment, each of the common electrodes 111 has a substantially uniform width L from one end of the common electrode to the other end of the common electrode. In this way, the coupling capacitance between the common electrodes 111 and the data lines 115 (namely the first touch electrode set TE1 and the second touch electrode set TE2) would be larger. Therefore, the touch display device 100 is more adapted for the application when the first touch electrode set TE1 and the second touch electrode set TE2 is at a distance. However, the invention is not limited thereto. In other embodiments, the shape of the common electrodes 111 may also be another type, which will be further described with reference to FIG. 7.

Figure 7:
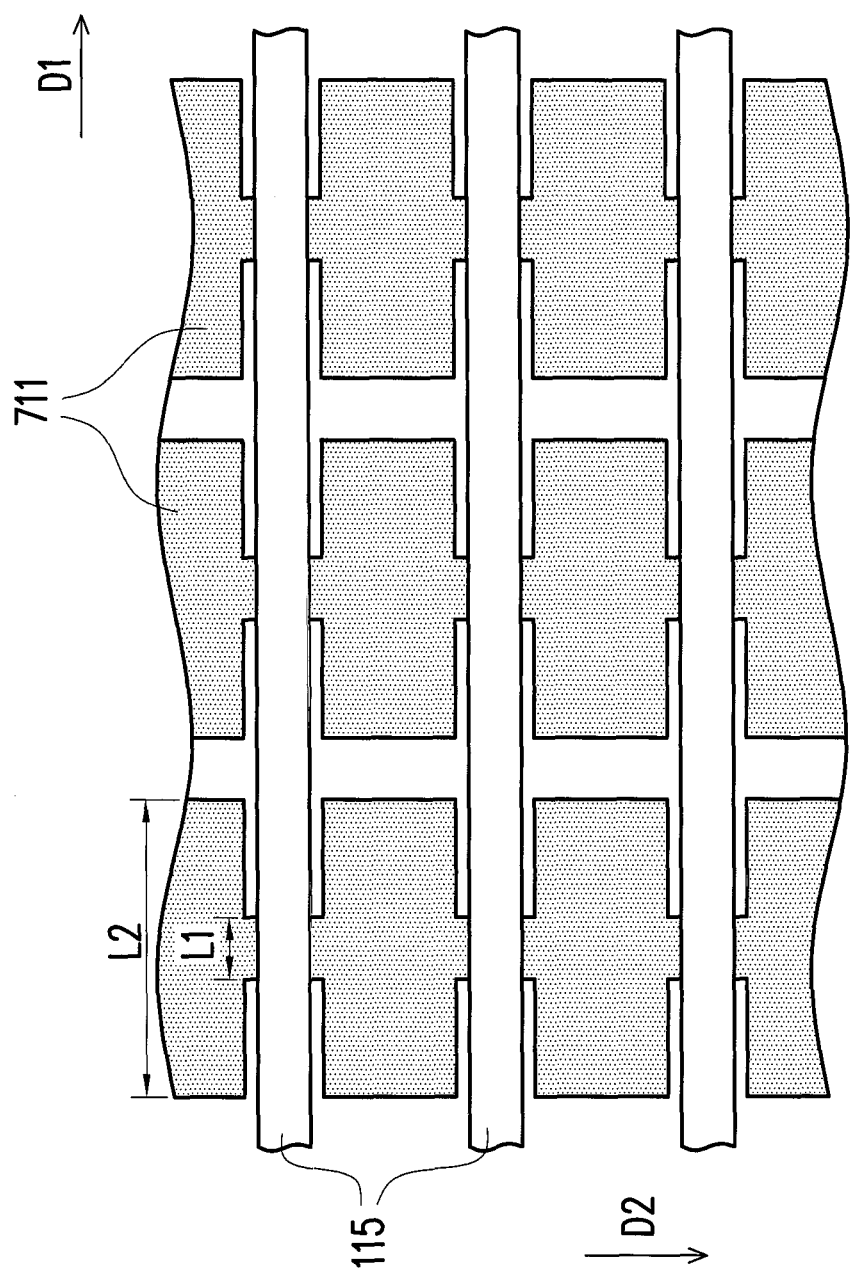
FIG. 7 is a schematic diagram illustrating common electrodes according to another embodiment of the invention.

FIG. 7 is a schematic diagram illustrating common electrodes according to another embodiment of the invention. The common electrodes 111 in the present embodiment is similar to the common electrodes 111 in the embodiment illustrated in FIG. 2, and only the differences between the two touch display modes will be explained below.

Referring to FIG. 7, in the present embodiment, the common electrodes 711 are arranged along a first direction D1, the data lines 115 are arranged along a second direction D2 which is perpendicular to the first direction D1, and each of widths L1 of parts of the common electrodes 711 overlapped by the data lines 115 is smaller than each of widths L2 of other parts of the common electrodes 711. In this way, the coupling capacitance between the common electrodes 711 and the data lines 115 (namely the first touch electrode set TE1 and the second touch electrode set TE2) would be smaller. Therefore, the touch display device 100 is more adapted for the application when the first touch electrode set TE1 and the second touch electrode set TE2 is close.

As described above, in a touch display device and a touch display method provided by the invention, a first touch electrode set and a second touch electrode set are formed by at least parts of common electrodes and at least parts of the data lines respectively. Moreover, the touch display device is capable of taking one of the first touch electrode set and the second touch electrode set as a transmitter and taking the other one of the first touch electrode set and the second touch electrode set as a receiver. In this way, the touch display device is capable of driving the first touch electrode set and the second touch electrode set through the same driving module which is used for driving the common electrodes and the data lines so as that it is not necessary to dispose an external control circuit. Besides, it is also not necessary to adding any process for defining any external pattern of electrodes which is used as the transmitter or the receiver of the touch display device. Therefore, the touch display device and the touch display method are capable of reducing cost of products.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display device comprising:
an active matrix comprising:
a plurality of common electrodes, at least parts of the common electrodes forming a first touch electrode set;
a plurality of scan lines;
a plurality of data lines, at least parts of the data lines forming a second touch electrode set; and
a plurality of active devices, each of the active devices coupled to one of the scan lines and one of the data lines;
a driving module coupled to the common electrodes, the scan lines, and the data lines;
a sensing module coupled to at least one of the first touch electrode set and the second touch electrode set; and
a control unit coupled to the driving module and the sensing module and configured to define frame times, each of the frame times comprising at least one display driving period and at least one touch sensing period, the control unit configured to cause the driving module to drive the scan lines, the data lines, and the common electrodes in the at least one display driving period to perform a displaying function, the control unit configured to cause the driving module to drive one of the first touch electrode set and the second touch electrode set and cause the sensing module to receive signals from the other one of the first touch electrode set and the second touch electrode set in the at least one touch sensing period so as to perform a touch sensing function, wherein the at least one display driving period comprised by each of the frame times is a plurality of display driving periods, and the at least one touch sensing period comprised by each of the frame times is a plurality of touch sensing periods.

2. The touch display device as claimed in claim 1, wherein the active devices are in an off state during the at least one sensing period.

3. The touch display device as claimed in claim 1, wherein the display driving periods and the touch sensing periods occur alternately in each of the frame times, the one of the first touch electrode set and the second touch electrode set comprises a plurality of first electrode subsets arranged in a direction, and the control unit is configured to cause the driving module to drive one of the scan lines in each of the display driving periods and to cause the driving module to drive one of the first electrode subsets during each of the touch sensing periods.

4. The touch display device as claimed in claim 1, wherein the display driving periods and the touch sensing periods occur alternately in each of the frame times, the one of the first touch electrode set and the second touch electrode set comprises a plurality of first electrode subsets arranged in a direction, and the control unit is configured to cause the driving module to drive parts of the scan lines in turn in each of the display driving periods and to cause the driving module to drive at least parts of the first electrode subsets in turn during each of the touch sensing periods.

5. The touch display device as claimed in claim 1, wherein the one of the first touch electrode set and the second touch electrode set comprises a plurality of first electrode subsets arranged along a first direction, the other one of the first touch electrode set and the second touch electrode set comprises a plurality of the second electrode subsets arranged along a second direction, and the control unit configured to cause the sensing module to receive signals from the second electrode subsets in the at least one touch sensing period.

6. The touch display device as claimed in claim 1, further comprising:
a multiplexer coupled to the first touch electrode set, the second touch electrode set, the control unit, and the sensing module, and the control unit controlling the multiplexer to determine that the signals from which one of the first touch electrode set and the second touch electrode set are received by the sensing module.

7. The touch display device as claimed in claim 1, wherein each of the common electrodes has a substantially uniform width from one end of the common electrode to the other end of the common electrode.

8. The touch display device as claimed in claim 1, wherein the common electrodes are arranged along a first direction, the data lines are arranged along a second direction which is perpendicular to the first direction, and each of widths of parts of the common electrodes overlapped by the data lines is smaller than each of widths of other parts of the common electrodes.

9. A touch display method, comprising:
defining frame times, wherein each of the frame times comprising at least one display driving period and at least one touch sensing period;

driving a plurality of scan lines, a plurality of data lines, and a plurality of common electrodes in the at least one display driving period to perform a displaying function, wherein the scan lines and the data lines are coupled through a plurality of active devices, each of the active devices is coupled to one of the scan lines and one of the data lines, the at least one display driving period comprised by each of the frame times is a plurality of display driving periods, and the at least one touch sensing period comprised by each of the frame times is a plurality of touch sensing periods;

driving one of a first touch electrode set and a second touch electrode set and receiving signals from the other one of the first touch electrode set and the second touch electrode set in the at least one touch sensing period so as to perform a touch sensing function wherein the first touch electrode set is formed with at least parts of the common electrodes and the second touch electrode set is formed with at least parts of the data lines.

10. The touch display method as claimed in claim 9, wherein the active devices are in an off state during the at least one sensing period.

11. The touch display method as claimed in claim 9, wherein the display driving periods and the touch sensing periods occur alternately in each of the frame times, the one of the first touch electrode set and the second touch electrode set comprises a plurality of first electrode subsets arranged in a direction, further comprising:

driving one of the scan lines in each of the display driving periods; and driving one of the first electrode subsets in each of the touch sensing periods.

12. The touch display method as claimed in claim 9, wherein the display driving periods and the touch sensing periods occur alternately in each of the frame times, the one of the first touch electrode set and the second touch electrode set comprises a plurality of first electrode subsets arranged in a direction, further comprising:

driving parts of the scan lines in turn in each of the display driving periods; and driving at least parts of the first electrode subsets in turn during each of the touch sensing periods.

13. The touch display method as claimed in claim 9, wherein the one of the first touch electrode set and the second touch electrode set comprises a plurality of first electrode subsets arranged along a first direction, the other one of the first touch electrode set and the second touch electrode set comprises a plurality of the second electrode subsets arranged along a second direction, further comprising:

receiving signals from the second electrode subsets in the at least one touch sensing period.

14. The touch display method as claimed in claim 9, further comprising:

determining that the signals from which one of the first touch electrode set and the second touch electrode set are received by a sensing module through a multiplexer wherein the multiplexer coupled to the first touch electrode set, the second touch electrode set, and the sensing module.

15. The touch display method as claimed in claim 9, wherein each of the common electrodes has a substantially uniform width from one end of the common electrode to the other end of the common electrode.

16. The touch display method as claimed in claim 9, wherein the common electrodes are arranged along a first direction, the data lines are arranged along a second direction which is perpendicular to the first direction, and each of widths of parts of the common electrodes overlapped by the data lines is smaller than each of widths of other parts of the common electrodes.

* * * * *